United States Patent
Meredith et al.

(10) Patent No.: US 8,769,143 B2
(45) Date of Patent: Jul. 1, 2014

(54) MOBILE DEVICE APPLICATION FOR AUTOMATIC FILTERING OF TRANSMITTED DATA CONTENT

(75) Inventors: Sheldon Meredith, Marietta, GA (US); Mark Austin, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 271 days.

(21) Appl. No.: 12/961,225

(22) Filed: Dec. 6, 2010

(65) Prior Publication Data
US 2012/0144057 A1 Jun. 7, 2012

(51) Int. Cl.
*G06F 15/16* (2006.01)

(52) U.S. Cl.
USPC ........... 709/232; 370/465; 370/466; 370/467; 370/468; 370/469

(58) Field of Classification Search
USPC .......................................... 709/232
See application file for complete search history.

(56) References Cited

U.S. PATENT DOCUMENTS

| | | | | |
|---|---|---|---|---|
| 6,519,636 | B2 * | 2/2003 | Engel et al. | 709/223 |
| 2003/0079028 | A1 * | 4/2003 | Kortum et al. | 709/229 |
| 2005/0025148 | A1 * | 2/2005 | Johansson et al. | 370/389 |
| 2005/0273499 | A1 * | 12/2005 | Goodman et al. | 709/206 |
| 2011/0106946 | A1 * | 5/2011 | Bao et al. | 709/225 |
| 2011/0276442 | A1 * | 11/2011 | Momtahan et al. | 705/30 |
| 2012/0117235 | A1 * | 5/2012 | Castro Castro et al. | 709/224 |
| 2013/0086265 | A1 * | 4/2013 | Bao et al. | 709/225 |

* cited by examiner

*Primary Examiner* — Tauqir Hussain
(74) *Attorney, Agent, or Firm* — Amin, Turocy & Watson, LLP

(57) ABSTRACT

A communications device is provided. This includes a processor adapted to receive one or more identified data sources from at least one network database. An applications component is configured to determine one or more network applications that communicate with the processor based in part on the one or more identified data sources. A filter can be configured to at least partially disable data exchanges to the one or more identified data sources during communications with at least one of the one or more network applications.

20 Claims, 12 Drawing Sheets

MOBILE DEVICE APPLICATION FOR AUTOMATIC FILTERING OF TRANSMITTED DATA CONTENT

TECHNICAL FIELD

The subject disclosure relates generally to network communications and, more particularly, to a device application where configurable filters are applied to block or filter non-desired network data exchanges in order to increase performance from desired or enabled network data exchanges.

BACKGROUND

The Internet has become a dominant communications platform in modern times. Almost all communications technologies are directly related or tangentially related to one or more Internet applications. Many applications support real-time communications where data is exchanged between parties. In one aspect, such data is exchanged according to a publisher and subscriber (or publisher/subscriber) data model. Loosely defined, a subscriber could be any network application that connects to any other publisher network application having the capabilities of communicating data to multiple such subscriber connections. More narrowly defined, a publisher/subscriber model may indicate some predetermined relationship such as an electronic subscription to a site before data content can be delivered. Some subscriptions may require monetary arrangements whereas other subscriptions may be free yet still require the user to go through some type of subscription process before data can be delivered from the respective publisher.

Publisher/subscriber technology can be described as a messaging pattern where senders (publishers) of messages are not programmed to send their messages to specific receivers (subscribers). Rather, published messages are characterized into classes, without knowledge of what, if any, subscribers there may be. Thus, subscribers express interest in one or more classes, and generally only receive messages that are of interest, without knowledge of what, if any, publishers there are. This decoupling of publishers and subscribers can allow for greater scalability and a more dynamic network topology.

In the publish/subscribe model, subscribers typically receive only a subset of the total messages published. The process of selecting messages for reception and processing is referred to as filtering, where there are two common forms of filtering: topic-based and content-based. In a topic-based system, messages are published to "topics" or named logical channels. Subscribers in a topic-based system will receive all messages published to the topics to which they subscribe, and all subscribers to a topic generally receive the same messages. The publisher is responsible for defining the classes of messages to which subscribers can subscribe. In a content-based system, messages are delivered to a subscriber if the attributes or content of those messages match constraints defined by the subscriber. The subscriber is thus responsible for classifying the messages. Some systems support a hybrid of the two; publishers post messages to a topic while subscribers register content-based subscriptions to one or more topics.

One problem with publisher/subscriber systems is a side-effect of their main advantage: the decoupling of publisher from subscriber. The problem is that it can be difficult to specify stronger properties that an application may need on an end-to-end basis. As a first example, many such systems attempt to deliver messages for a time, but then give up. If an application actually needs a stronger guarantee (such as: messages will always be delivered or, if delivery cannot be confirmed, the publisher will be informed), the system probably will not have a mechanism to deliver the respective property. Another example arises when a publisher "assumes" that a subscriber is listening. For instance, assume that a publisher/subscriber system logs problems in a factory where: any application that senses an error publishes an appropriate message, and the messages are displayed on a console by the logger daemon, which subscribes to the "errors" topic. If the logger happens to crash, publishers will not have a mechanism to observe this event, and all error messages will vanish.

Wireless networks are now responsible for transmitting volumes of Internet traffic and are increasingly burdened by the growth of data transmission demand from subscribers. For example, much of the transmitted data occurs without the user's awareness. In fact, many web sites such as related to common news organizations may connect to 20 or 30 domains to either download advertising content to a communications device or to collect tracking information from the device in order to create demographic profiles of the users or sometimes, other nefarious purposes. Thus, the customer experience can be degraded since these tangential connections utilize network bandwidth that could otherwise be applied to transmission of desired content. Often, the desired content is textual, while the advertising content tends to be graphic with the result of a highly disproportionate amount of the total transfer being for undesired data.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Systems and methods are provided to increase performance of network data exchanges. Configurable filters operating on a device such as a mobile wireless device enable users to automatically or selectively block non-desired or non-enabled data exchanges directed at their respective devices. By blocking or filtering (partially or completely) data exchanges related to non-desirable or nefarious content, data throughput of desired or enabled data content is facilitated. Not only is such network data throughput increased in a micro-sense between device and network applications of interest for example, but collective or macro-sense network performance is increased since multiple devices adapted to filter content exchanges reduces or mitigates overall network data transmissions. When collective "non-desired" data transmissions have been reduced in the network across multiple devices due to configurable and automated filtering, the aggregate data throughput performance of the network can increase.

In one aspect, an application is provided that can operate on a mobile wireless device that identifies domain names (or other source identifiers received from a remote database) to which one or more applications on the device are attempting to connect. These names are compared in real time to a local database on the device to identify matches (or partial matches). Name matches identified result in outgoing messages to the respective domain being filtered in order that such connections are not enabled. This can include complete blocking to the domain or partial blocking as policy or other configurable rules may define. Filtering can also be performed on a macro-cellular network or other network connections such as WiFi or Bluetooth, for example. As can be appreciated, such filtering could be applied in accordance with wireless and/or wired network connections. When outgoing requests for matched domain names are filtered, the desired wireless data requests and delivery are not effected, the network resource requirements are reduced since non-desired connections are mitigated, and the user experience in terms of perceivable data download speed is improved. Some nefarious tracking can also be halted.

To the accomplishment of the foregoing and related ends, the subject disclosure then, comprises the features hereinafter fully described. The following description and the annexed drawings set forth in detail certain illustrative aspects. However, these aspects are indicative of but a few of the various ways in which the principles disclosed herein may be employed. Other aspects, advantages and novel features will become apparent from the following detailed description when considered in conjunction with the drawings.

DETAILED DESCRIPTION

Systems and methods are provided to facilitate network data exchange. In one aspect, a communications device is provided. This includes a processor adapted to receive one or more identified data sources from at least one network database. An applications component is configured to determine one or more network applications that communicate with the processor based in part on the one or more identified data sources. A filter can be configured to at least partially disable data exchanges to the one or more identified data sources during communications with at least one of the one or more network applications.

As used in this application, the terms "component," "system," "filter," "policy," "rule," "monitor," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
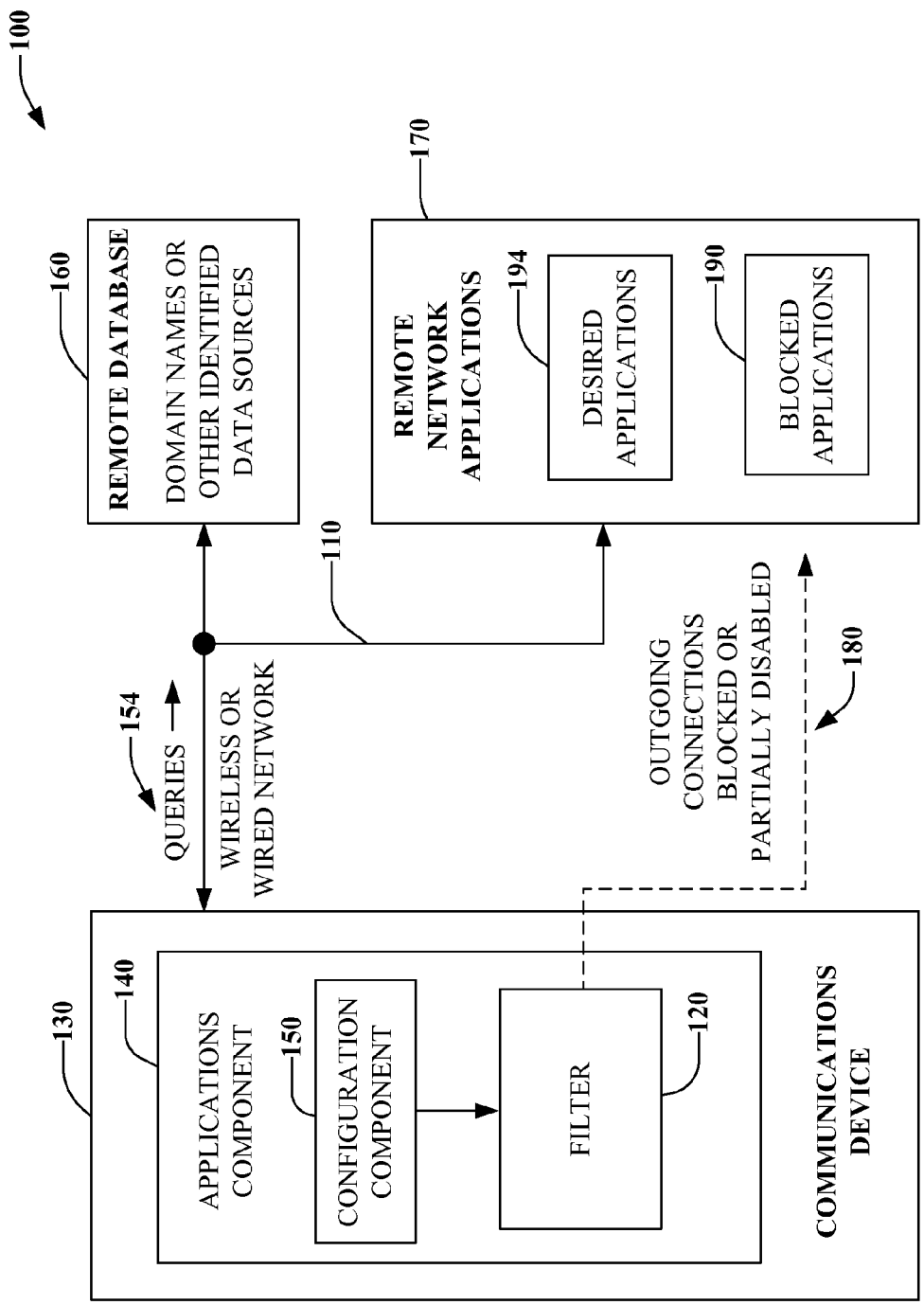
FIG. 1 a schematic block diagram of a network system where filters are applied on communications devices to automatically or selectively block non-desired data exchanges.

Referring initially to FIG. 1, a system 100 illustrates a network 110 (wireless and/or wireless) where a filter 120 (or filters) is applied on communications device 130 to automatically or selectively block non-desired data exchanges. The communications device 130 includes an applications component 140 that operates the filter 120, wherein a configuration component 150 is provided to customize filter operations according to automated monitoring or user configuration which is described in more detail below. As shown, the applications component 140 issues one or more queries 154 across the network 110 to a remote database 160 (or databases). The remote database 160 returns domain names or other data source identifiers which indicate data locations or connections for the filter 120 to block or partially disable.

In one aspect, the domain names are compared to an internal or local database (not shown) operating on or in accordance with the communications device 130. During communications with one or more remote network applications 170, the internal database on the communications device 130 is compared in real time to connections that are attempted by the respective device. Any domain names (or other source identifiers) that are matched (or meeting filter criteria established by configuration component 150) will have outgoing connections blocked as shown at 180 by the filter 120. As can be appreciated, such connections 180 can be completely blocked or partially disabled according to criteria established for the filter 120 by the configuration component 150.

In one example, a domain name relating to a blocked application 190 is received from the remote database 160 in response to the query 154. If the received domain name correlates to a domain name connection that is being attempted by the communications device 130, the filter 120 then blocks (e.g., disables, ignores) such connection at 180 and does not commence further communications with the blocked application 190. As will be described in more detail below, such blocking at 180 may be in accordance with other rules or policy that is applied by the configuration component 150. For instance, a policy may be configured such that 50% of attempted data transfers are allowed to the blocked application 190, whereas 50% of such attempts are disallowed. As shown, connections that are not filtered at 120 according received domain names or other source identifiers from the remote database 160, and are not similarly filtered according to a configured rule or policy, are established with one or more desired applications 194 across the network 110. By mitigating data transfers to non-desired or blocked applications 190, data transfer performance to desired applications 194 can be improved since less bandwidth is employed or utilized for blocked or non-desired applications.

In one aspect, the system 100 increases performance of network data exchanges. Configurable filters 120 operating on the communications device 130 such as a mobile wireless device enable users to automatically or selectively block non-desired or non-enabled data exchanges directed at their respective devices. By blocking or filtering (partially or completely) data exchanges at 180 related to non-desirable or nefarious content applications 190, data throughput of desired or enabled data content is facilitated at 194 across the network 110. Not only is such network data throughput increased in a micro-sense between device and network applications of interest for example at 194, but collective or macro-sense network performance is increased since multiple devices adapted to filter content exchanges reduces or mitigates overall network data transmissions. When collective "non-desired" data transmissions have been reduced in the network 110 across multiple devices (not shown) due to configurable and automated filtering described herein, the aggregate data throughput performance of the network 110 can increase.

In one aspect, the application 140 operates on a mobile wireless device that identifies domain names (or other source identifiers received from a remote database) to which one or more applications on the device are attempting to connect. These names are compared in real time to a local database on the communications device 130 to identify matches (or partial matches). Name matches identified result in outgoing messages to the respective domain being filtered in order that such connections are not enabled at 180. This can include complete blocking to the domain or partial blocking as policy or other configurable rules may define. Filtering can also be performed on a macro-cellular network or other network connections such as WiFi or Bluetooth, for example. As can be appreciated, such filtering could be applied in accordance with wireless and/or wired network connections. When outgoing requests for matched domain names are filtered, the desired wireless data requests and delivery are generally not effected, the network resource requirements are reduced since non-desired connections are mitigated, and the user experience in terms of perceivable data download speed is improved. Some nefarious tracking can also be halted.

In one particular aspect, a communications device 130 is provided, wherein the device includes a processor (not shown) adapted to receive one or more identified data sources from at least one network database 160. The applications component 140 is adapted to determine one or more network applications 170 that communicate with the processor based in part on the one or more identified data sources. The filter 120 can be configured to at least partially disable data exchanges at 180 to the one or more identified data sources (such as the blocked applications 190) during communications with at least one of the one or more network applications 170. The one or more identified data sources can be associated with a tag, a name, a domain name, a data type, a file extension, or a portion of a component, for example, that is related to the identified data sources and is described in more detail below. The configuration component 150 can be employed to select the network data base 160, to augment the one or more identified data sources, or to enable or disable the filter 120.

As will be described in more detail below, a policy component can be adapted to configure the filter 120, wherein the policy component determines the types of content to block and/or a context in which content is blocked. The context can include times, dates, identified users, applications, or data types, for example when connections 180 should be blocked and outside of or in addition to the matching conditions described above. Such context can also provide limitations to blocking. The policy component can also include an interface to define one or more configurable rules for operation of the filter 120, where the rules can define a percentage of data traffic that is allowed from disabled sources. The rules can also define a portion of a label or tag that is employed (for matching or correlating with remote database identifiers) to disable or partially disable multiple sources that include at least the portion of the label or tag as an identifier. In another aspect, a monitor component (described below) can automatically determine other potential data exchanges 180 to block. For instance, the monitor component can analyze device activity to desired applications to determine potential data exchanges to block or analyze applications in a class to determine potential data exchanges to block. For example, the class can be related to a corporate policy, a junk mail application, an application type, or a user-defined class.

Figure 2:
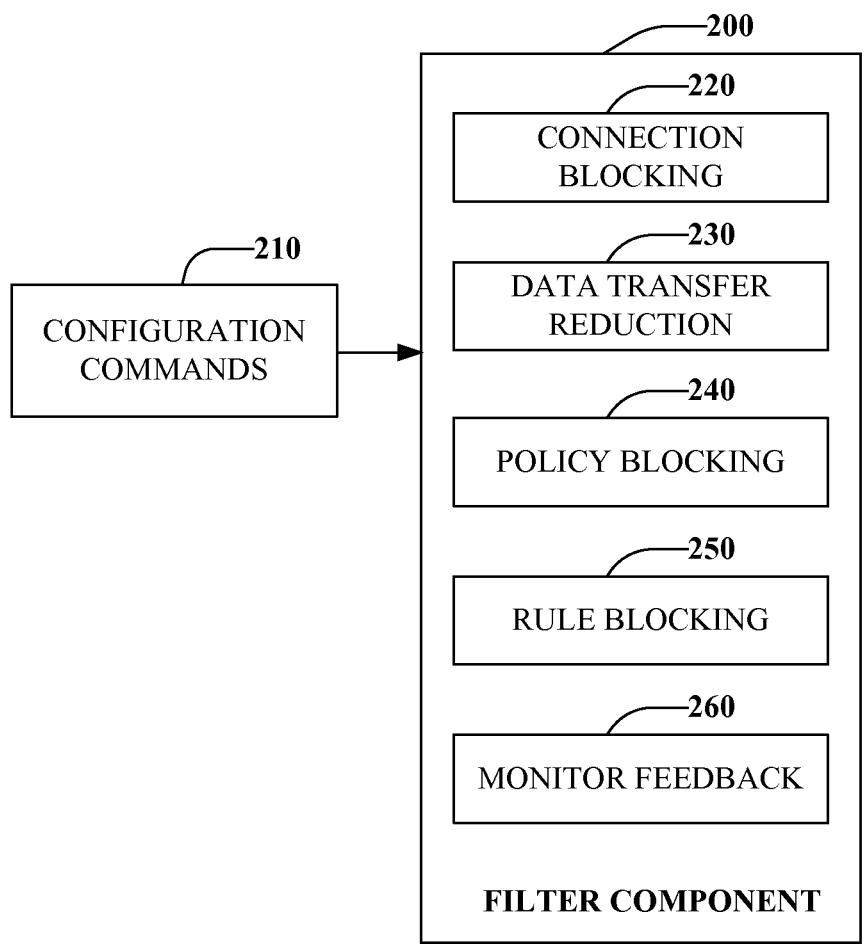
FIG. 2 is a block diagram of a filter that employs configuration commands to block or partially disable network data exchanges to non-desired applications.

FIG. 2 is a filter 200 that employs configuration commands 210 to block or partially disable network data exchanges to non-desired applications. As will be described in more detail below, the configuration commands 210 can be generated via a configuration interface and/or automatically determined via automated monitoring of device activities. At 220, the filter 200 is configured for connection blocking. In this case, remote names or tags (or other identifiers described below) are received from a remote database and stored internally on a device. When a connection is attempted, the names or tags at 220 are compared with the connection name or type. If a match (or other criteria) is found between the stored name or tag at 220 and the attempted connection having the same name or tag, then the filter 200 is configured to block the connection from occurring with the remote application associated with the name or tag at 220.

In another aspect, the filter 220 may be configured for partial blocking to a connection at 230. In this example, a percentage or other specification may be configured at 230 where instead of completely blocking a connection identified at 220, a portion of traffic to the respective connection can be enabled. For example, a specification such as allow 10% of attempted data transfers to blocked domain name to transfer. In another example, a predetermined number of data transfers per a given time period may be specified (e.g., 150 kilo bytes/hour can transfer to the blocked connection). In another example, the filter 200 may apply one or more policies 240 which further refine when or if data transfers can commence. For example, a policy may be set up that all domains that are specified at 220 are only blocked between the hours of noon until 5:00 PM. Rules at 250 can similarly be applied by the filter 220 to further refine how and when data transfers/connections are blocked or enabled. Such rules and policies are described in more detail below with respect to FIG. 3. In yet another aspect, feedback monitoring conditions may be applied at 260, where automated monitoring on the device defines one or more conditions where data connections or transfer are blocked, partially disabled, or enabled. Such monitoring is described in more detail with respect to FIG. 6.

Figure 3:
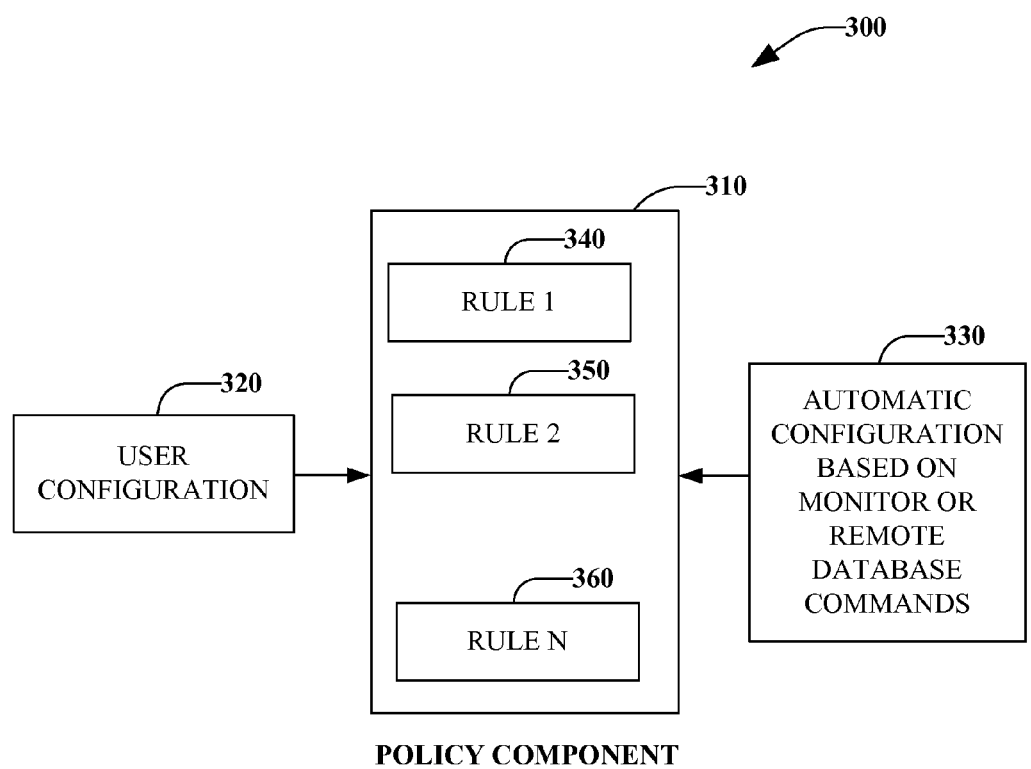
FIG. 3 is a block diagram of a system that employs policies and rules to control operations of a configurable filter.

FIG. 3 is a system 300 that employs policies and rules to control operations of a configurable filter described herein. As shown, a policy component 310 can receive user configuration at 320 or configuration from automated components 330 that are described in more detail below. The policy can include one or more rules 340-360 that further refine or define the respective policy. In general policies can be applied in a more global manner than rules and are generally defined as a subset of the rules 340-350. However, it is to be appreciated such distinctions between policy and rules are often not important as rules can operate as policies and policies can be applied as rules.

The policy component 310 is adapted to configure the filter component previously described, wherein the policy component determines the types of content to block and/or a context in which content is blocked. For example, the context can include times, dates, identified users, applications, data types, and so forth. The policy component 310 can also include an interface (See FIG. 4 below) to define one or more configurable rules 340-360 for operation of the filter component. In one specific example, the rules define a percentage of data traffic that is allowed from disabled sources. In other words, the rules may change a completely blocked connection as defined by the remote database identifiers described above into a partially blocked connection. The rules can also define a portion of a label or tag that is employed to disable or partially disable multiple sources that include at least the portion of the label or tag as an identifier as described in more detail below with respect to FIG. 5. In a more detailed example, the policy component 310 may be configured as combinations of user-defined or automatically generated rules or conditions. Thus, Boolean combinations of policies and/or rules can be applied to automatically control which network connections to disable and/or which network connections to enable.

Figure 4:
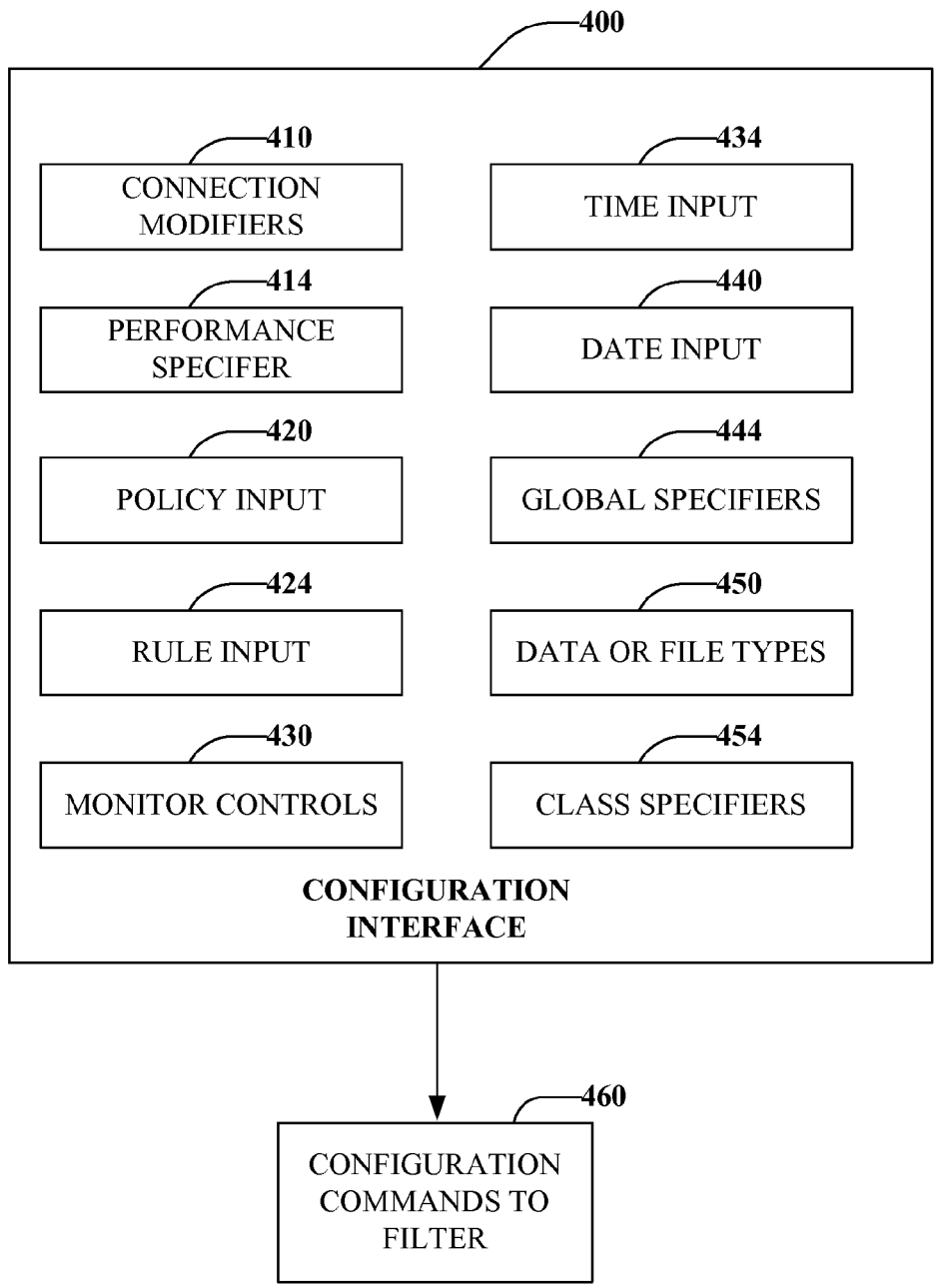
FIG. 4 is a block diagram illustrating a configuration interface to configure a filter to automatically block non-desired data exchanges.

FIG. 4 is a block diagram illustrating a configuration interface 400 to configure a filter to automatically block (or partially enable) non-desired data exchanges. At 410, connection modifiers are specified. This can include lists that are in addition to those source identifiers received from the remote database. This can also include wildcard specifiers that can be applied to further disable network connections. At 414, a performance specifier can be configured. Such specifier can include a percentage or a rate where a blocked connection can operate in accordance with the percentage or rate so specified. At 420 and 424, rules and policies can be input as are described in more detail below with respect to FIG. 4. At 430, monitor controls can be specified. These can include conditions when automated monitoring determinations can be applied—if any. For example, only apply automated monitoring conditions to connections that are established with these types of applications or these data types.

At 434 and 440, date and time inputs can be entered that specify conditions for when blocking is to be applied. At 444, global specifications or conditions can be input. For example, disable all blocking during hours where collective Internet usage or performance is determined to be below a predetermined threshold. At 450, data or file type conditions can be specified where if such data or file types are encountered during remote network communications, such communications can be blocked (partially or completely as configured input or conditions dictate). At 454, class specifiers can be entered. This can include specifying connections based on a relationship to a class like connections related to a junk filter or connections related to a scrubber or firewall application designed to prevent nefarious access to the communications device. As shown, output from the configuration component 400 can be utilized to generate configuration commands at 460 for the filter described above. As can be appreciated, other configuration options from the examples shown at 400 can be employed.

Figure 5:
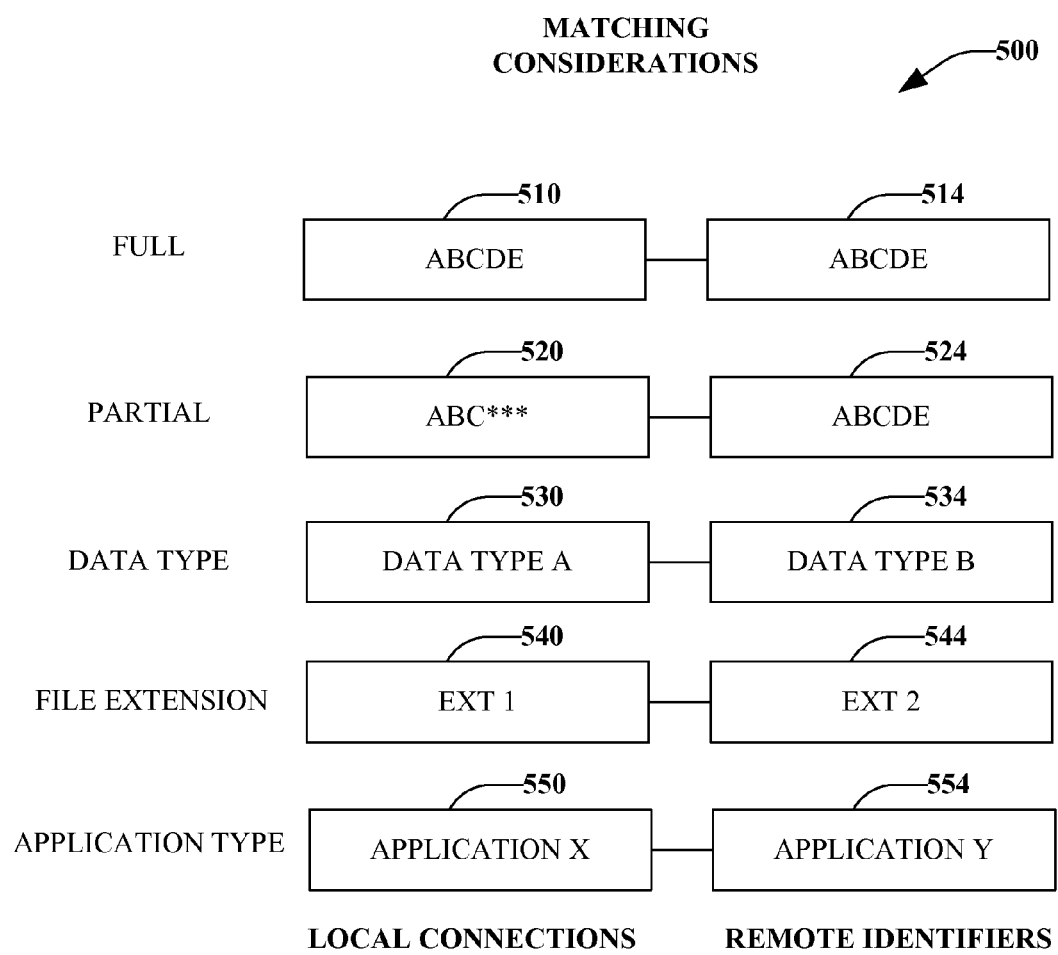
FIG. 5 is a diagram illustrating how connection matches are determined for blocking or partial blocking of non-desired data exchanges.

FIG. 5 is a diagram 500 illustrating how connection matches are determined for blocking or partial blocking of non-desired data exchanges. On the left of diagram 500, example local connection names are illustrated, whereas on the right of diagram 500, example connection names that are received from a remote database are illustrated. When a match (or positive comparison) is determined between the local connections and the remote names received, network connection blocking can be achieved by the communications device. At 510 and 514, an example of full name blocking is illustrated. Thus, when a local connection 510 is attempted to the name "ABCDE," such connection is blocked from occurring since the name "ABCDE" was received from the remote database. At 520 and 524, an example of partial or wildcard name blocking is illustrated. The local connection at 520 is attempting a connection to a node name "ABC*," wherein * represents any identifier. At 524, the name "ABCDE" and according to wildcard rules would be blocked or filtered since ABC of each name is matched between 520 and 524. As can be appreciated, wildcards can be specified on the local device via configuration (automated or manual) of can be specified at the remote database (e.g., all connections starting with ABC should be blocked).

At 530 and 534, data type matching is considered. In this example, Data Type A at 530 does not match the Data Type B specified from the remote connection and thus blocking would not be specified for communication with Data Type A at 530. At 540 and 544, file extension matching is considered (e.g., .doc, .pdf, .vsd, and so forth). In this example, Ext 1 at 540 does not match the EXT 2 at 544 specified from the remote connection and therefore blocking would not be specified for communication with file EXT 1 at 540. At 550 and 554, application matching is considered. In this example, Application X at 550 does not match the Application Y at 554 specified from the remote connection and thus blocking would not be specified for communication with Application X at 550. As can be appreciated, other identifiers can be specified than the examples shown at 500.

Figure 6:
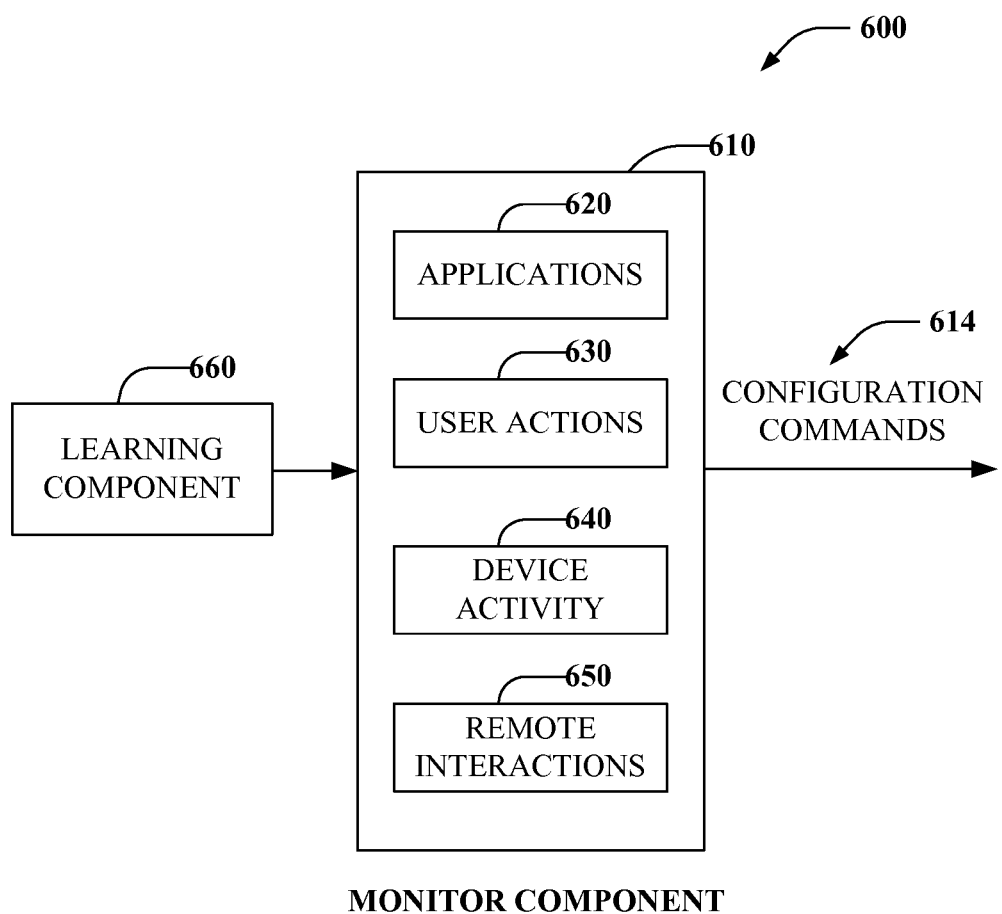
FIG. 6 is a block diagram illustrating a monitoring system to automatically determine criteria for controlling filter operations.

FIG. 6 is a block diagram illustrating a monitoring system to automatically determine criteria for controlling filter operations. As shown, a monitor component 610 may monitor one or more aspects of a communications device to automatically determine conditions for desired or non-desired network exchanges, wherein such conditions are converted to one or more configuration commands 614 that are applied to the filters as previously described. Such aspects that may be monitored include applications 620 that the user or device may interact with. For example, some applications may elicit extensive user interaction indicating a desired application whereas other applications are ignored or disabled by the user indicating non-desired applications. In another aspect, user actions can be monitored at 630. For example, if a user drills down on a particular data type or file type, it can indicate a desired application connection whereas if a user routinely closes a connection, it may indicate a non-desired connection that can provide clues to the filter for further blocking in the form of the commands 614. At 640, general device activity can be monitored and this can include an automated accounting over time of the types of applications or connections that are allowed versus those that are disallowed or non-desired. At 650, remote application interactions can be monitored to determine further clues or automated policies or rules that can be developed in the form of the configuration commands 614.

In a more elaborate aspect, the monitor component 610 may include intelligent aspects such as classifiers that analyze data exchanges based on observed or detected patterns of usage. This can include an inference component (not shown) that further enhances automated data exchange aspects utilizing, in part, inference based schemes to facilitate inferring automated configuration commands 614. For example, a learning component 660 may detect over time that whenever data exchanges are with a particular user or regarding a particular subject, that a user always decides to cache data associated with the respective message exchange. Thus, an automated policy can be setup via the learning to enable the respective exchanges overriding remote tags that are received indicating that the exchanges should be blocked. In another aspect, the learning may indicate further blocking of connections that are above and beyond those received from the source identifiers of the remote database. The classifiers can be implemented via any suitable machine learning based technique or statistical-based techniques or probabilistic-based techniques or fuzzy logic techniques. Specifically, these components can implement models based upon learning processes (e.g., confidence, inference). For example, a parameter adjustment model can be generated via an automatic classifier system.

A support vector machine (SVM) is an example of a classifier that can be employed. Other directed and undirected model classification approaches include, e.g., naïve Bayes, Bayesian networks, decision trees, and probabilistic classification models providing different patterns of independence can be employed. Classification as used herein also is inclusive of statistical regression that is utilized to develop models of usage, access, storage, or denial. Classifiers can be explicitly trained (e.g., via a generic training data) as well as implicitly trained (e.g., via observing user behavior, receiving extrinsic information). For example, SVM's can be configured via a learning or training phase within a classifier constructor. In other words, the use of expert systems, fuzzy logic, support vector machines, greedy search algorithms, rule-based systems, Bayesian models (e.g., Bayesian networks), neural networks, other non-linear training techniques, data fusion, utility-based analytical systems, systems employing Bayesian models, etc. are contemplated and are intended to fall within the scope of the hereto appended claims.

Figure 7:
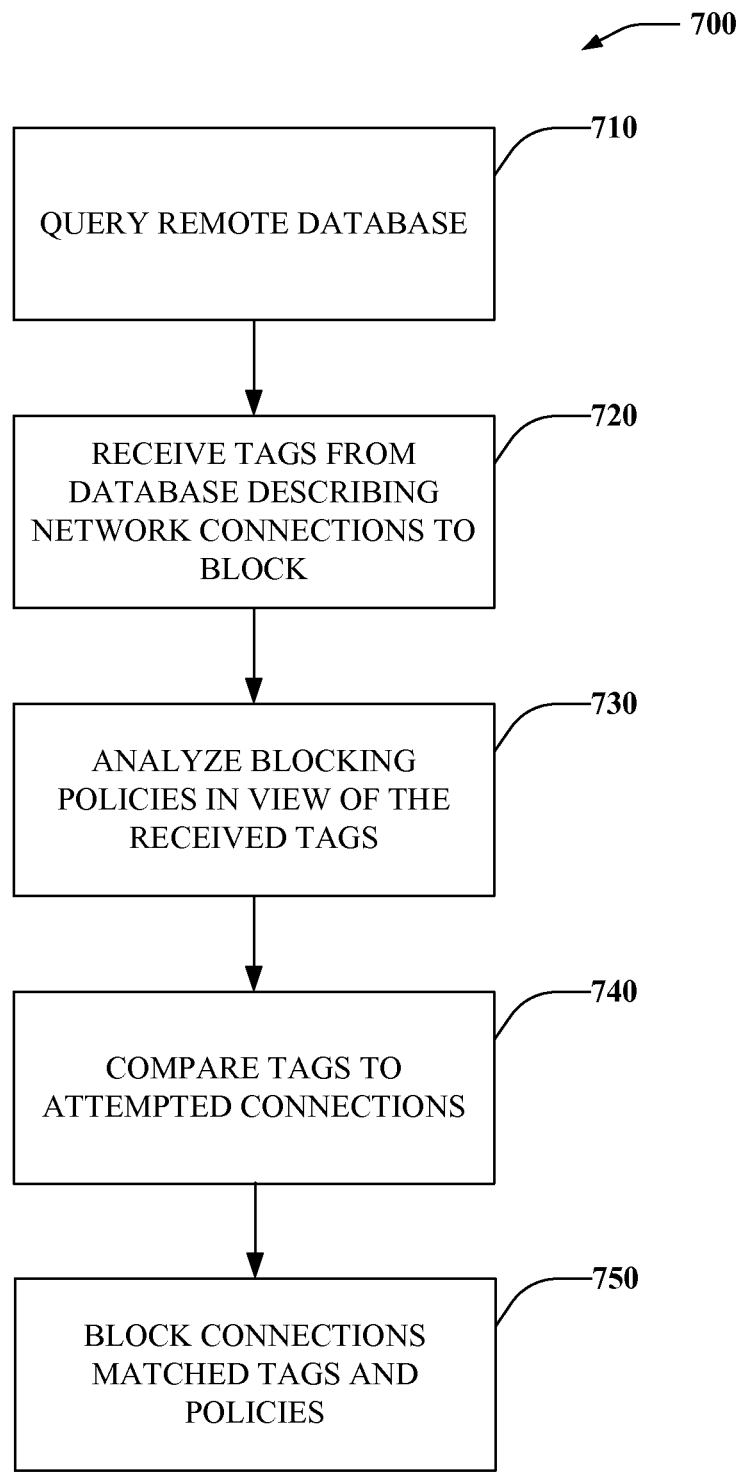
FIG. 7 is a flow diagram illustrating a process that facilitates enhanced performance for network data exchanges.

FIG. 7 is a flow diagram illustrating a process 700 that facilitates enhanced performance for network data exchanges. In view of the example systems described above, example methodologies such as depicted in FIG. 7 can be implemented in accordance with the disclosed subject matter and can be better appreciated with reference to flowcharts described herein. For purposes of simplicity of explanation example methods are presented and described as a series of acts; however, it is to be understood and appreciated that the various embodiments are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Proceeding to 710 of the process 700, one or more remote databases are queried for information relating to potential network connections to block of filter at a communications device. At 720, data tags are received (in response to the query) from a network that indicate potential data sources to partially or completely block. At 730, one or more policies and/or rules are analyzed that further define how or when connections should be blocked or filtered. At 740, the received data tags are analyzed in view of the policies to automatically determine desired network connections to enable or non-desired network connections to block or partially disable. Such analysis can include comparing or matching the tags to connection names that are being attempted by the respective communications device. At 750, the non-desired network connections are blocked while communicating with the desired network connections, wherein the blocking includes partial or complete disablement of the non-desired network connections.

Other aspects of the process 700 include configuring a filter to further define or modify the desired network connections or the non-desired network connections. This can include configuring at least one policy that defines parameters for operation of the filter. Other aspects include configuring at least one rule to define a context for the policy component, wherein the context includes at least one of times, dates, identified users, applications, classes, or data types. Another aspect includes monitoring communications to automatically determine desired network connections or non-desired network connections, wherein the monitoring includes applying an automated learning component to members of a class to determine the desired network connections or the non-desired network connections. This can also include utilizing a portion of the data tags to determine the potential data sources. For example, using a wildcard to specify a portion of a domain name (e.g., domain XYZ includes domain XYZABCD).

Figure 8:
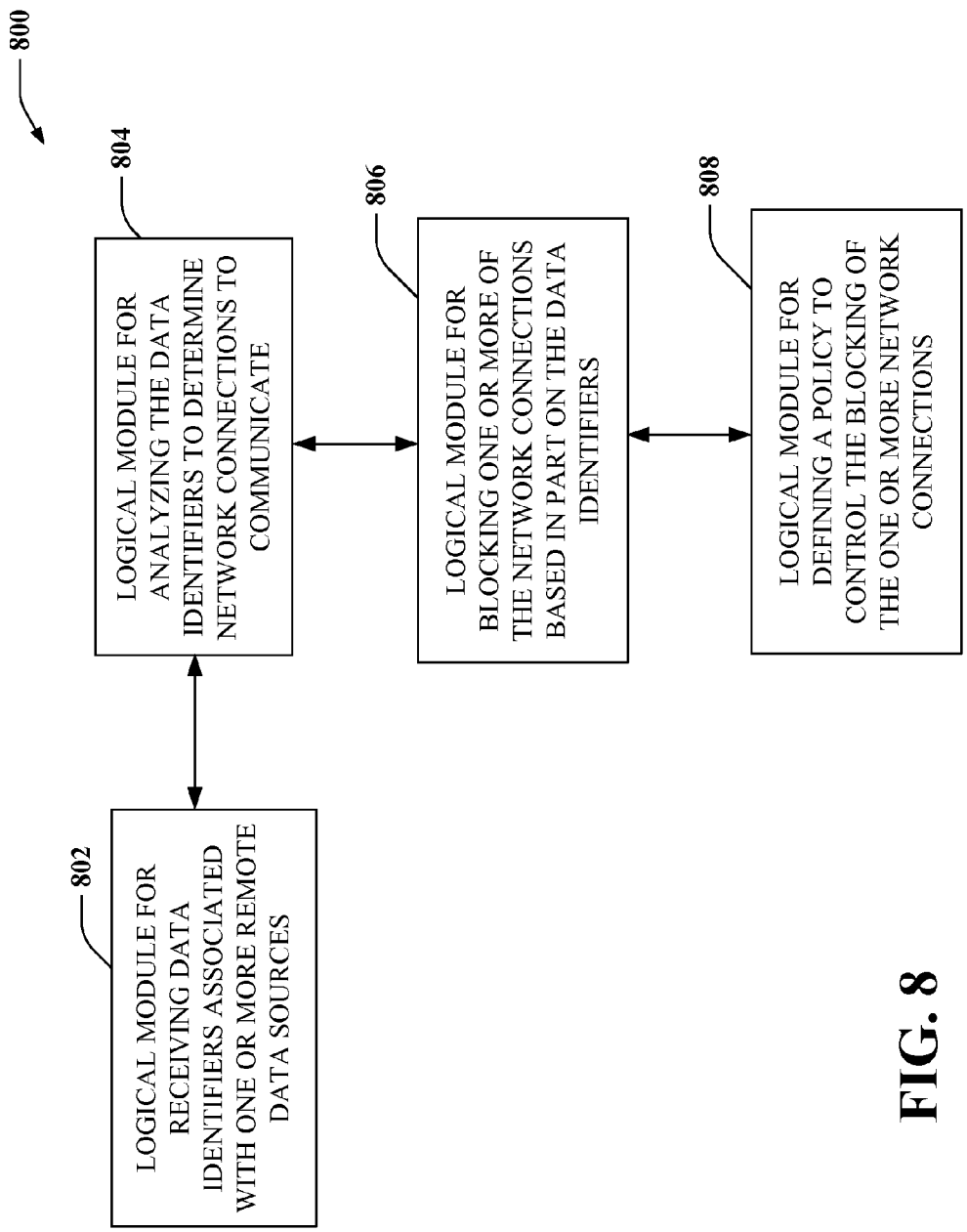
FIG. 8 is a block diagram illustrating logical modules for automatically or selectively blocking non-desired data exchanges.

FIG. 8 is a block diagram illustrating a device 800 having logical modules for automatically or selectively blocking non-desired data exchanges. Such modules can relate to a sequence or process ordering with respect to a terminal, operator networks, access nodes, and traffic flows therewith. The device 800 is represented as a series of interrelated functional blocks, which can represent functions implemented by a processor, software, a thread, hardware, firmware, and/or any suitable combination thereof.

Referring specifically to FIG. 8, the device 800 includes a logical module 802 for receiving data identifiers associated with one or more remote data sources. The device 800 includes a logical module 804 for analyzing the data identifiers to determine network connections to communicate. This includes a logical module 806 for blocking one or more of the network connections based in part on the data identifiers, where the blocking can include partial or complete blocking of data traffic. The device 800 also includes a logical module 808 for defining a policy to control the blocking of the one or more network connections.

Figure 9:
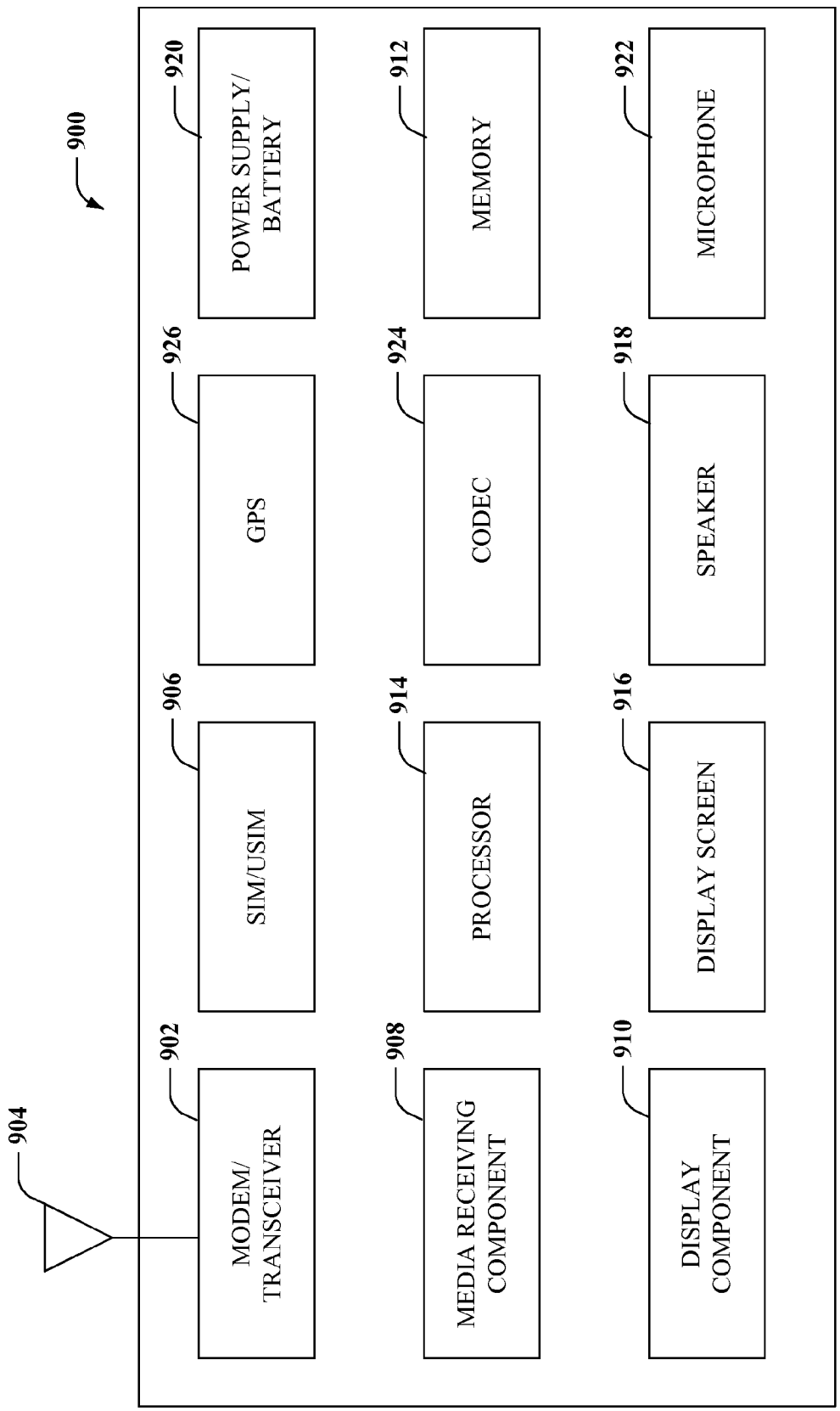
FIGS. 9-12 illustrate example systems that can be employed with configurable filters to block non-desired network exchanges.

FIG. 9 illustrates an additional or alternative example aspect of a wireless system that can implement features and aspects described herein and operated in accordance with such features and aspects. The example system 900 can include a modem 902 that can wirelessly communicate with a wide area network, for example, employing a 2G/3G/3.5G/4G wireless connection. As an example, the modem 902 can be a wireless wide area network (WWAN) modem/transceiver such as a GPRS/EDGE/CDMA/UMTS/HSPA/LTE modem that can transfer digital images (or other media files) and/or control data. Moreover, the modem 902 can operate in any of the commonly used wireless spectrum bands. As an example, the modem 902 can be IPv6 (Internet Protocol version 6) enabled. It can be appreciated that the modem 902 can be embedded in the system 900 or external to the system and can be connected to an antenna 904 to receive and/or transmit data. The antenna 904 can be external or internal. Moreover, the modem 902 can receive instructions sent by a remote user (e.g. system subscriber) over a network, e.g., a mobile network platform that serves a network of deployed access points, to change one or more settings and/or perform one or more functions on the example system 900, for example, load, delete or play a file. Furthermore, the modem 902 can also be configured to receive wireless alerts (SMS, Image)/broadcast from a mobile network platform. Additionally, the example system 900 of a can include a SIM (Subscriber Identity Module) or USIM (Universal Subscriber Identity Module) 906 associated with the system users account subscription. The SIM or USIM 906 can be prepaid, flat rate monthly, or usage based. Further, the SIM or USIM 906 may need to be a locked to the specific type of device (e.g., a wireless digital media that employs a WWAN modem) to prevent it from being used in a mobile phone or wireless data device to prevent network abuse if lower rates, including flat rate, are offered to the system subscribers.

A media receiving component 908 can receive media files, e.g., content(s), sent to the example system 900 through an access point via the modem 902. Received media files can be displayed through display component 910. The modem 902 can include control functions to enable communication with the WWAN and transfer of data in the downlink. The modem 902 can be downlink enabled and can optionally allow the ability to transfer data in the uplink (UL) direction beyond control channels. For example, the system 900 can transfer data associated with available free space in memory 912 to a mobile network platform in the UL. Further, the modem 902 can be configured to allow network control such that transfer of data could occur at various times of the day based on network/sector loading due to traffic and propagation conditions and/or based on user preferences. Further, the modem 902 can be configured to work on a prepaid condition or active account or unlimited usage account.

The system 900 can typically include a processor 914 that can be a processor based controller chip. Specifically, the processor 914 can be a processor dedicated to analyzing information received by modem 902 and/or generating information for transmission on the UL, a processor that controls one or more components of the system 900, a processor that facilitates output of media files on a display screen 916 or via speaker 918, and/or a processor that both analyzes information received by modem 902, generates information for transmission on the UL, controls one or more components of the system 900 and facilitates output of media files on a display screen 916 or via speaker 914.

The system 900 can additionally comprise memory 912 that is operatively coupled to processor 914 and that can store data to be transmitted, received data, data associated with analyzed signal and/or interference strength, information related to an assigned channel, power, rate, or the like, and any other suitable information for estimating a channel and communicating via the channel Memory 912 can additionally store media files received from a sender over a network. Further, memory 912 can also store user preferences and/or predefined user settings. In one example, memory 912 can be partitioned, such that locally downloaded media files (e.g. downloaded by an end user) are stored in one partition and remotely downloaded media files (e.g., content(s) are stored in another partition. A number of program modules can be stored in the memory 912, including an operating system, one or more application programs, other program modules and/or program data. It is appreciated that the aspects described herein can be implemented with various commercially available operating systems or combinations of operating systems.

Additionally, a system bus (not shown) can be employed to couple system components including, but not limited to, the system memory 912 to the processor 914. The system bus can be any of several types of bus structure that may further interconnect to a memory bus (with or without a memory controller), a peripheral bus, and a local bus using any of a variety of commercially available bus architectures.

The media files received from the mobile wireless network can be displayed on the display screen 916 and/or audio files can be played via the speaker 918. It can be appreciated that the media files stored in the memory 912 can also be received via ports such as, but not limited to, USB, USB2, 1395, SD card, Compact Flash, etc. Additionally, system 900 can include a power supply/battery 920 that can be employed to power the system. As an example, power management techniques can be employed to save battery power, such that the battery can last longer between recharge cycles.

An end user can enter commands and information through one or more wired/wireless input devices, e.g., a keyboard, a pointing device, such as a mouse and/or a touch screen display 916. A microphone 922 can also be employed to enter data. For example, the end user can employ the microphone 922 to enter an audio clip associated with an image. These and other input devices are often connected to the processor 914 through an input device interface (not shown) that is coupled to a system bus, but can be connected by other interfaces, such as a parallel port, an IEEE 1394 serial port, a game port, a USB port, an IR interface, and so forth The system 900 can further include a codec 924 that can be employed encode and/or decode digital data. The codec 924 can employ most any compression and/or decompression algorithm to compress/decompress a received media file. Furthermore, the system 900 can include a GPS (global positioning system) 926 that can be employed to determine the current geographical coordinates of the example the system 900. The GPS 926 can include a separate GPS antenna (not shown) or employ the antenna 904 to communicate with a GPS satellite. In one example, the example system 900 can receive broadcast warnings, emergency alerts, weather alerts, etc. based on the current coordinates.

In addition, the example system 900 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag, and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
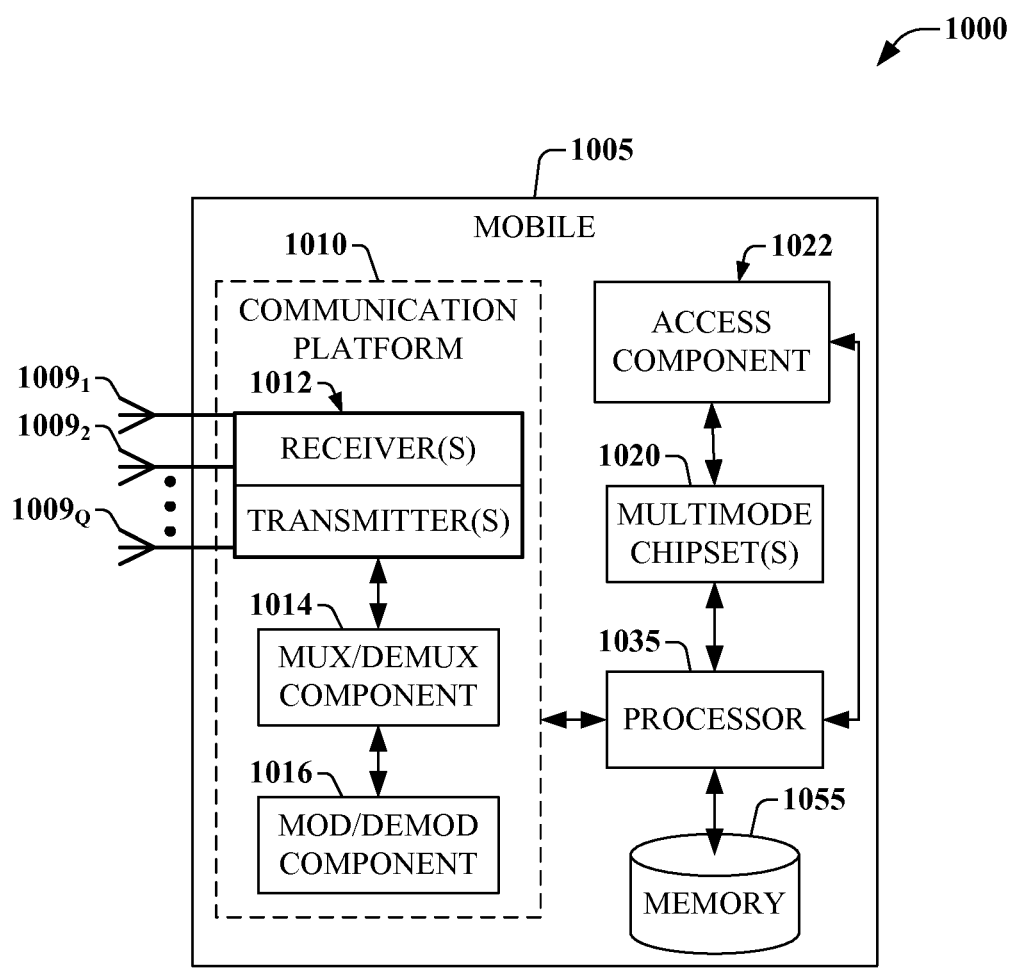
Figure 11:
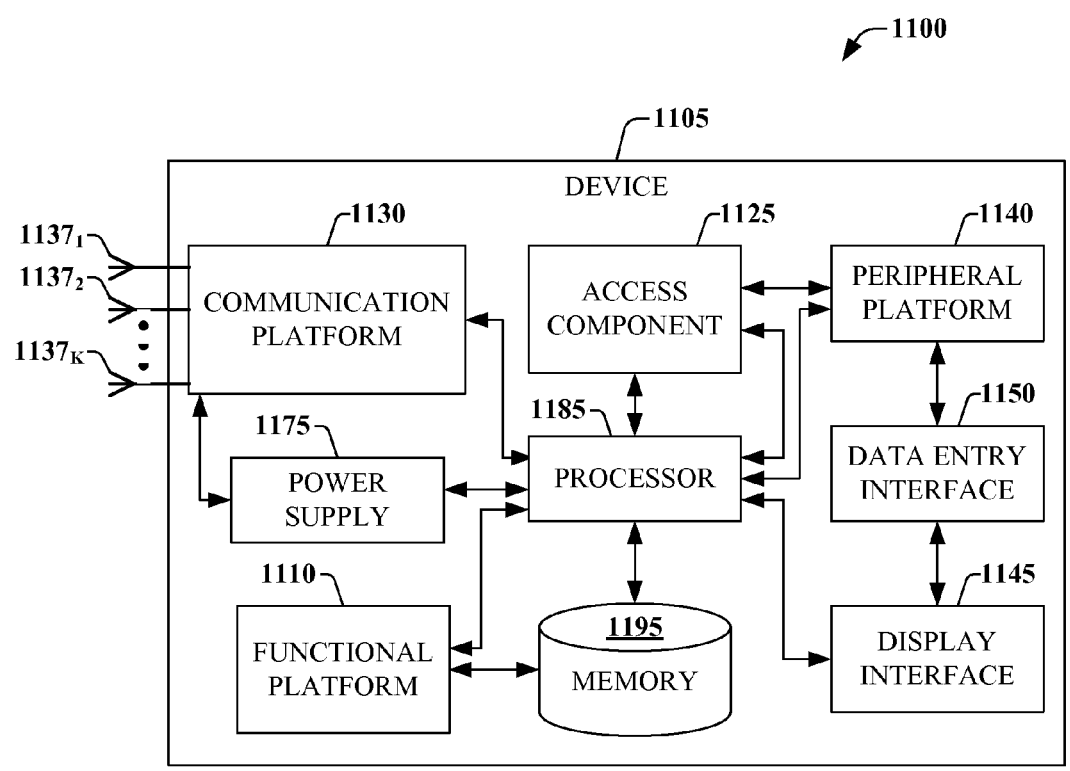
Figure 12:
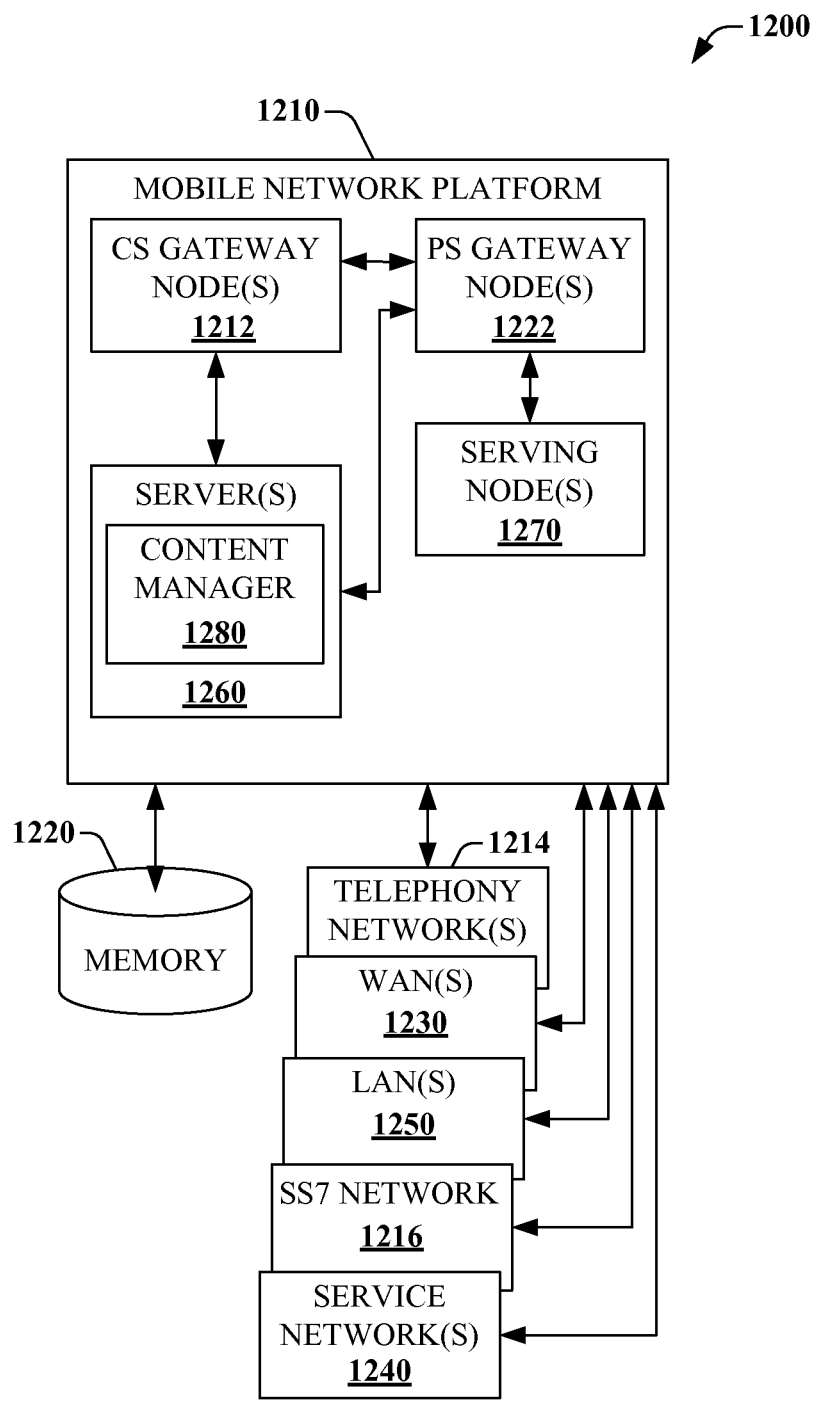

To provide further context for various aspects described herein, FIG. 10 illustrates a block diagram of an example system 1000 of a mobile 1005 that can deliver content(s) or signaling directed to a device in accordance with aspects described herein. Additionally, FIG. 11 presents a block diagram of an example system 1100 of a non-mobile device 1105, which can be provisioned through a non-mobile network platform and can be employed to convey content(s) or signaling to a device in accordance with aspects described herein. Furthermore, FIG. 12 presents an example system 1200 of a mobile network platform 1210 which can provide content management service in accordance with aspects described herein.

In the mobile 1005 of FIG. 10, which can be a multimode access terminal, a set of antennas $1009_1$-$1009_Q$ (Q is a positive integer) can receive and transmit signal(s) from and to wireless devices like access points, access terminals, wireless ports and routers, and so forth that operate in a radio access network. It should be appreciated that antennas $1009_1$-$1009_Q$ are a part of communication platform 1010, which comprises electronic components and associated circuitry that provide for processing and manipulation of received signal(s) and signal(s) to be transmitted; e.g., receivers and transmitters 1012, mux/demux component 1014, and mod/demod component 1016.

In the system 1000, multimode operation chipset(s) 1020 allows mobile 1005 to operate in multiple communication modes in accordance with disparate technical specification for wireless technologies. In an aspect, multimode operation chipset(s) 1020 utilizes communication platform 1010 in accordance with a specific mode of operation (e.g., voice, Global Positioning System (GPS)). In another aspect, multimode operation chipset(s) 1020 can be scheduled to operate concurrently (e.g., when Q>1) in various modes or within a multitask paradigm.

Mobile 1005 includes access component 1022 and can convey content(s) or signaling in accordance with aspects described herein. It should be appreciated that access component 1022, can include a display interface that render content in accordance with aspects of an interface component (not shown) that resides within access component 1022.

Mobile 1005 also includes a processor 1035 configured to confer functionality, at least in part, to substantially any electronic component within mobile 1005, in accordance with aspects described herein. As an example, processor 1035 can be configured to execute, at least in part, instructions in multimode operation chipset(s) that afford multimode communication through mobile 1005 such as concurrent or multitask operations of two or more chipset(s). As another example, processor 1035 can facilitate mobile 1005 to receive and convey signaling and content(s) (e.g., various data flows) that are part of an active management act initiated by a subscriber that operates mobile 1005, or an approval cycle associated with auxiliary subscribers (e.g., secondary subscriber, tertiary subscriber . . . ). Moreover, processor 1035 facilitates mobile 1005 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. Memory 1055 can store data structures (e.g., metadata); code structure(s) (e.g., modules, objects, classes, procedures) or instructions; network or device information like policies and specifications, attachment protocols; code sequences for scrambling, spreading and pilot (e.g., reference signal(s)) transmission; frequency offsets, cell IDs, and so on.

In the system 1000, processor 1035 is functionally coupled (e.g., through a memory bus) to memory 1055 in order to store and retrieve information necessary to operate and/or confer functionality, at least in part, to communication platform 1010, multimode operation chipset(s) 1020, access component 1022, and substantially any other operational aspects of multimode mobile 1005.

FIG. 11 is a block diagram of an example system 1100 of a non-mobile device that can convey content(s) exploit various aspects of content transaction(s) as described herein. Device 1105 includes a functional platform 1110 that comprises a set of components (not shown) that provide, at least in part, one or more specific functionalities of the non-mobile device 1105. Additionally, non-mobile device 1105 includes an access component 1125 that operates in accordance with aspects described hereinbefore. Moreover, in an aspect, non-mobile device 1105 can include a communication platform 1130 that can provide wireless communication capabilities in addition, or alternatively, to connectivity of non-mobile device 1105 through wired links (e.g., Ethernet, USB, GPIB, RS-232, FireWire, optical or coaxial cable connection to a network interface such as network interface, or router (not shown)). With respect to wireless capability, in non-mobile device 1105, which can be a multimode access terminal, a set of antennas $1137_1$-$1137_P$ (P is a positive integer) can receive and transmit signal(s) from and to wireless devices like access points, access terminals, wireless ports and routers, etc., that operate in a radio access network. Communication platform 1130 can exploit the set of P antennas $1137_1$-$1137_K$, (K is a positive integer) to establish communication within various modes such as single-input single-output, or multiple-input multiple output.

Additionally, in non-mobile device 1105, a peripheral component 1140 can include, or facilitate connection to, additional devices such as printer(s), media player(s), wireless router(s) (e.g., network interface), biometrics touchpad(s), etc. In an aspect, to afford such connectivity, peripheral component 1140 can include jacks for one or more of Ethernet, USB, GPIB, RS-232, FireWire, optical or coaxial cable connectors. Additionally, display interface 1145 can be a part of functional platform 1110 (e.g., when non-mobile device 1105 is a PC, an IPTV interface, a mobile, a back projector component, a data projector . . . ). In an aspect, display interface 1145 can be a liquid crystal display (LCD), a plasma panel, a monolithic thin-film based electro-chromic display, and so on. It should be appreciated that rendering areas in display interface 1145 can be substantially disparate.

It should be appreciated that non-mobile device 1105 also can include a data entry interface 1150 that can allow an end user to perform at least one of (i) command non-mobile device via configuration of functional platform 1110, (ii) deliver content(s) or signaling directed in accordance to aspects described herein, or (iii) generate content(s) (e.g., images via a built-in camera) or directive(s) for subscribed content.

Power supply 1175 can power-up device 1105 and substantially any component included thereon. It should be appreciated that alternative or additional embodiments of device 1105 may not include power supply 1175 and be powered via an attachment to a conventional power grid.

In the system 1100, non-mobile device 1105 includes processor 1185 which can be functionally coupled (e.g., through a memory bus) to memory 1195 in order to store and retrieve information to operate and/or confer functionality, at least in part, to access component 1125, and substantially any component(s) thereon in accordance with aspects described herein; functional platform 1110; communication platform 1130 and substantially any other component of non-mobile device 1105. With respect to access component 1125, and components thereon, processor 1185 can be configured to execute access protocols to convey credentials and gains access to a content management service to convey multimedia content(s) or signaling to a subscribed WDMF. In addition, in connection with communication platform 1130, processor 1185 is configured to confer functionality, at least in part, to substantially any electronic component within communication platform 1130. Moreover, processor 1185 facilitates communication platform 1130 to process traffic and control data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Memory 1195 also can retain multimedia content(s) or security credentials (e.g., passwords, encryption keys, digital certificates) that facilitate access to a content management service. In addition, memory 1195 can store data structures (e.g., metadata); code structure(s) (e.g., modules, objects, classes, procedures) or instructions, or substantially any type of software or firmware that processor 1185 can execute to provide functionality associated with functional platform 1130; network or device information like policies and specifications; code sequences for scrambling, spreading and pilot (e.g., reference signal(s)) transmission; and so on.

FIG. 12 presents an example system 1200 of a mobile network platform 1210 which can provide a content management service for content(s) and signaling in accordance with aspects described herein. Generally, mobile network platform 1210 can include components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect, as described above, component within PS domain of network platform 1210 can be employed to effect communication among sources of content(s) and subscriber files in accordance with aspects described herein.

With respect to CS communication, mobile network platform 1210 includes CS gateway node(s) 1212 which can interface CS traffic received from legacy networks such as telephony network(s) 1214 (e.g., public switched telephone network (PSTN), or public land mobile network (PLMN)) or a SS7 network 1216. Circuit switched gateway node(s) 1212 can authorize and authenticate traffic (e.g., voice) arising from such networks. Additionally, CS gateway node(s) 1212 can access mobility, or roaming, data generated through SS7 network 1216; for instance, mobility data stored in a visitation location register (VLR), which can reside in memory 1220. Moreover, CS gateway node(s) 1212 interfaces CS-based traffic and signaling and gateway node(s) 1222. As an example, in a 3GPP UMTS network, CS gateway node(s) 1212 can be embodied, at least in part, in gateway GPRS support node(s) (GGSN).

In addition to receiving and processing CS-switched traffic (e.g., content(s) that can be part of a content(s) transmitted by a service provider) and signaling, PS gateway node(s) 1222 can authorize and authenticate PS-based data sessions with served mobile devices, non-mobile devices, and access points. Data sessions can include traffic, or content(s), exchange with networks external to the mobile network platform 1210, such as wide area network(s) (WANs) 1230 or service network(s) 1240; it should be appreciated that local area network(s) (LANs) 1250 can also be interfaced with mobile network platform 1210 through PS gateway node(s) 1222. Packet-switched gateway node(s) 1222 generates packet data contexts when a data session is established. To that end, in an aspect, PS gateway node(s) 1222 can include a tunnel interface (e.g., tunnel termination gateway (TTG) in 3GPP UMTS network(s) (not shown)) which can facilitate packetized communication with disparate wireless network(s), such as network platform and associated radio access network, Wi-Fi networks. It should be further appreciated that the packetized communication can include multiple flows that can be generated through service (e.g., provisioning) and application server(s) 1260. It is to be noted that in 3GPP UMTS network(s), PS gateway node(s) 1222 (e.g., GGSN) and tunnel interface (e.g., TTG) comprise a packet data gateway (PDG).

The mobile network platform 1210 also includes serving node(s) 1270 that convey the various packetized flows of data streams (e.g., content(s) or signaling directed to a subscribed data), received through PS gateway node(s) 1222. As an example, in a 3GPP UMTS network, serving node(s) 1270 can be embodied in serving GPRS support node(s) (SGSN).

Server(s) 1260 in mobile network platform 1210 can execute numerous applications (e.g., location services, online gaming, wireless banking, wireless device management . . . ) that can generate multiple disparate packetized data streams or flows, and manage (e.g., schedule, queue, format . . . ) such flows. Such application(s), for example can include add-on features to standard services provided by mobile network platform 1210. Data streams (e.g., content(s) or signaling directed to a file) can be conveyed to PS gateway node(s) 1222 for authorization/authentication and initiation of a data session, and to serving node(s) 1270 for communication thereafter.

Server(s) 1260 can also effect security (e.g., implement one or more firewalls) of mobile network platform 1210 to ensure network's operation and data integrity in addition to authorization and authentication procedures that CS gateway node(s) 1212 and PS gateway node(s) 1222 can enact. Moreover, server(s) 1260 can provision services from external network(s), e.g., WAN 1230, or Global Positioning System (GPS) network(s) (not shown). It is to be noted that server(s) 1260 can include one or more processor configured to confer at least in part the functionality of macro network platform 1210. To that end, the one or more processor can execute code instructions stored in memory 1220, for example. It is should be appreciated that server(s) 1260 can include a content manager 1280.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; femto cell configuration (e.g., devices served by a femto AP; access control lists, or white lists) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the various embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
   a memory to store executable instructions; and
   a processor, coupled to the memory, that facilitates execution of the executable instructions to perform operations, comprising:
      receiving an indication of a data source from a network data store;
      determining a network application that communicates with the device and is not associated with a data request based in part on the indication of the data source; and
      at least partially disabling a data exchange to the data source during a communication with the network application that is not associated with the data request based on a logical combination of configurable rules that defines a percentage of data exchanges, including the data exchange, that are at least partially disabled.

2. The device of claim 1, wherein the data source is associated with a tag, a name, a domain name, a data type, a file extension, or a portion of a component that is related to the data source.

3. The device of claim 2, wherein the operations further comprise selecting the network data store, to augment the data source, or to at least partially enable or disable the data exchange.

4. The device of claim 1, wherein the operations further comprise configuring the disabling of the data exchange and determining a type of content to block and a context in which the content is blocked.

5. The device of claim 4, wherein the context includes a time, a date, a user, an application, or a data type.

6. The device of claim 1, wherein the operations further comprise selecting the data exchange related to the network application that is not associated with the data request based on the logical combination of the configurable rules.

7. The device of claim 1, wherein the logical combination of the configurable rules defines another percentage of data exchanges that is allowed from the data source during another communication with the network application that is not associated with the data request.

8. The device of claim 1, wherein the logical combination of the configurable rules defines a portion of a label or tag that is employed to disable or partially disable a set of data sources that comprise the portion of the label or tag as an identifier.

9. The device of claim 1, wherein the operations further comprise determining another data exchange from the data source to block based on the logical combination of the configurable rules.

10. The device of claim 9, wherein the operations further comprise analyzing device activity comprising application activity to determine the other data exchange to block.

11. The device of claim 9, wherein the operations further comprise analyzing applications of a class of applications to determine the other data exchange to block.

12. The device of claim 11, wherein the class is related to a corporate policy, a junk mail application, an application type, or a class defined based on device input.

13. A method, comprising:
   receiving, by a system comprising a processor, a data tag from a network device that indicates a data source to block;
   analyzing, by the system, the data tag to determine a first network connection associated with the data source to block; and
   blocking, by the system, the first network connection associated with the data source concurrently with communicating with a second network connection associated with the data source, wherein the blocking comprises disablement of the first network connection based on a logical combination of rules that defines a percentage of data traffic that is blocked.

14. The method of claim 13, further comprising configuring, by the system, a filter to modify the first network connection.

15. The method of claim 14, further comprising configuring, by the system, a policy that defines a parameter for operation of the filter.

16. The method of claim 13, wherein the analyzing comprises identifying, by the system, the first network connection as a member of a class to determine the first network connection.

17. The method of claim 13, further comprising utilizing, by the system, a portion of the data tag to determine the data source.

18. A computer-readable storage device comprising computer-executable instructions that, in response to execution, cause a device comprising a processor to perform operations, comprising:

receiving a data identifier associated with a data source;
analyzing the data identifier to determine network connections that are not associated with a set of data requests and for which communication is to be disabled; and
blocking a network connection of the network connections that is not associated with a data request from the set of data requests based on the data identifier and a logical combination of policies associated with the network identifier, wherein the logical combination of the policies defines a percentage of data transfers of the network connection that are blocked.

19. The computer-readable storage device of claim 18, wherein the blocking comprises controlling the blocking of another network connection of the network connections based on the logical combination of the policies.

20. The computer-readable storage device of claim 18, wherein the blocking comprises blocking the network connection of the network connections based on an application associated with a policy of the policies.

\* \* \* \* \*